US008676726B2

(12) United States Patent
Hore et al.

(10) Patent No.: US 8,676,726 B2
(45) Date of Patent: Mar. 18, 2014

(54) AUTOMATIC VARIABLE CREATION FOR ADAPTIVE ANALYTICAL MODELS

(75) Inventors: Prodip Hore, San Diego, CA (US); Scott M. Zoldi, San Diego, CA (US); Larry Peranich, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 252 days.

(21) Appl. No.: 12/982,819

(22) Filed: Dec. 30, 2010

(65) Prior Publication Data

US 2012/0173465 A1    Jul. 5, 2012

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 6,519,580 B1 * | 2/2003 | Johnson et al. | 706/47 |
| 6,567,814 B1 * | 5/2003 | Bankier et al. | 1/1 |
| 7,231,612 B1 * | 6/2007 | Mani et al. | 715/841 |
| 2003/0220860 A1 * | 11/2003 | Heytens et al. | 705/35 |
| 2009/0292568 A1 | 11/2009 | Khosravani et al. | |
| 2010/0228580 A1 | 9/2010 | Zoldi et al. | |

OTHER PUBLICATIONS

Fawcett et al., "Adaptive Fraud Detection", Jurnal of Data Mining and Knowledge Discovery, vol. 1, No. 3, Jan. 1, 1997.
Bastos, "Credit scoring with boosted decision", Retrieved from the Internet: <URL:http://mpra.ub.uni-muenchen.de/8034/>, retrieved on May 10, 2012.
Basak, "Online adaptive clustering in a decision tree framework", 19th International Conference on Pattern Recognition, Dec. 8, 2008.
Wu et al., "Top 10 algorithms in data mining", Knowledge and Information Systems, An International Journal, vol. 14, No. 1, Dec. 4, 2007.
PCT International Search Report and Written Opinion dated May 29, 2002, for corresponding PCT application No. PCT/US2011/065935.

* cited by examiner

*Primary Examiner* — Kakali Chaki
*Assistant Examiner* — Michael Zidanic
(74) *Attorney, Agent, or Firm* — Mintz Levin Cohn Ferris Glovsky and Popeo, P.C.

(57) ABSTRACT

A system and method for automated variable creation for adaptive fraud analytics are disclosed. A data structure for creation of rules is generated. The data structure represents nodes and associations between nodes from inputs for fraud/non-fraud conditions, and is generated from fraud and non-fraud data collected in an adaptive modeling process from past transactions. All unique paths between nodes of the data structure are determined to define a rule for each path. Each rule is then converted to a binary indicator variable to generate a set of binary indicator variables, and one or more complex variables is derived from the set of binary indicator variables. The one or more binary indicator variables and one or more complex variables can be provided to an adaptive scoring engine to score new transactions or to predict future behaviors.

20 Claims, 4 Drawing Sheets

AUTOMATIC VARIABLE CREATION FOR ADAPTIVE ANALYTICAL MODELS

BACKGROUND

This disclosure relates generally to fraud analytics, and more particularly to adaptive analytics system and methods with automatic variable creation.

Predictive models are typically trained on labeled/tagged historical data, often using supervised learning algorithms and a fixed set of pre-defined variables, and then the models are used to evaluate unlabeled future data. Distributions of data (fraud and non fraud transactions) evolve/change over time, and these changes cause model performance to degrade. Recent advances in fraud detection models involve online/ real time/adaptive learning models that are capable of updating their parameters over time when changing distributions of fraud and non-fraud data are encountered in production. This is generally done by periodically retraining the adaptive model in an automated method that updates model parameters based on current fraud/non-fraud data in production. This helps prevent degradation of model performance and allows the fraud model to adapt its model weights to new fraud behaviors in production, compared with static weights in a base model that has been trained on a fixed dataset of historical data.

Performance of any model depends on the quality of labels/ tags, and also on feature detector variables derived from the data used during training. Labels/tags, during training, allow the model to learn to differentiate to which class (fraud/non fraud) a particular transaction or state of the account belongs. Effective feature detector variables are inputs to the models and enable the models to separate the two classes. Creating meaningful feature detector variables is fundamentally important, because without them the model will not be able to separate classes (fraud from non-fraud) well. Model variables are typically created manually, relying on domain knowledge of experts and validated against historical data of fraud and non-fraud. This approach to defining variables often suffers from limitations of the expert, preventing exploration of all possible dimensions of variables to best classify fraud and non-fraud. Having a data-driven method to define variables has long been a need in the development of predictive models, as has finding an automated method to run in production environments and to couple with an adaptive analytics model.

SUMMARY

In general, this document discloses a system and method for automatically creating variables for adaptive models in real-time and in the production environment. The system and method provide advancement to fraud detection by supplementing adaptive model technologies, which re-weight variable inputs, with automated variable creation to allow for new variables to be defined in production to best detect fraudulent transactions more effectively in uncertain conditions. The system and method is an analytics system to adjust in real-time to changing fraud tactics, rather than waiting for new variables to be defined as part of a traditional model building exercise, where variables are based on the gathering of historical data and defined offline. The system and method provide improved robustness of fraud detection models by deriving variables from more meaningful inputs that are associated with detection, and focus on classification of fraud and non-fraud, and as such the automatic variable creation allows for differentiation of non-fraud and consequently lowering false-positives while improving fraud detection.

Ideal adaptive models are enabled to generate their own data driven variables automatically. The automatic variables are created from raw transaction inputs or derived from existing defined static model variables. The system and method allows for the discovery of hidden patterns/association from the raw base inputs and defines new variables automatically in production, which is important to detection of fraud, which itself is constantly evolving in response to predictive models designed to ferret out fraudsters. After the automatic variables are defined, they can be used as inputs in the adaptive model algorithm, and used to allow the model to best detect fraud patterns in real-time and in the production environment while reducing false positives. Adaptive models are important in fraud detection as they are not constrained by only those patterns that existed in the historical data on which the standard supervised model is based.

In one aspect, a computer-implemented method includes generating a data structure for creation of rules. The data structure representing nodes and associations between nodes from inputs for fraud/non-fraud conditions, and is generated from fraud and non-fraud data collected in an adaptive modeling process from past transactions. The method further includes determining all unique paths between nodes of the data structure to define a rule for each path, each rule having one or more preconditions, converting each rule to a binary indicator variable to generate a set of binary indicator variables, and deriving one or more complex variables from the set of binary indicator variables. The method further includes providing the one or more binary indicator variables and one or more complex variables to an adaptive scoring engine to score new transactions.

Articles are also described that include a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes an automated variable creation method and system, and an adaptive analytics system that employs automated variable creation techniques.

Figure 1:
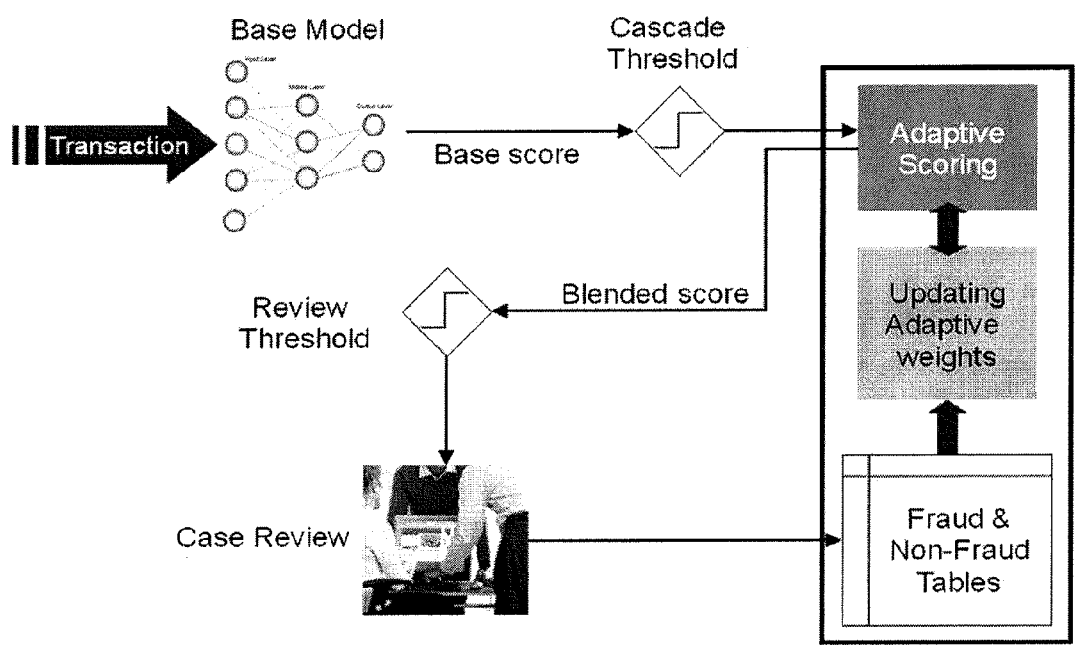
FIG. 1 illustrates a cascade fraud detection system with a static base model and corresponding adaptive model, but without any automatic variable creation.

A fraud detection system which does not employ automated variable creation is shown in FIG. 1. This system consists of a static base model that produces a base score for incoming transactions. If the base score is above a cascade threshold, indicating a moderate likelihood of fraud, the transaction is also scored by the adaptive model. When scoring the transaction the adaptive model will utilize input variables that are fixed at the time the adaptive model is developed, and do not change during model operation in production. The base score and the score from the adaptive model are blended mathematically to produce a blended score that is more predictive than either the base score or the adaptive model score by themselves. If the blended score is above a review threshold, indicating a high likelihood of fraud, a case is created and sent to human fraud experts who will determine whether or not the corresponding transaction was fraudulent. The transaction and associated variables, and other transactions from the same credit/debit card account, will have the fraud/non-fraud information appended and sent to the fraud and non-fraud tables of the adaptive model. Periodically, the data in the fraud and non-fraud tables are used to update the weights in the adaptive model.

Consider a data set having n data points, $d_1, d_2, \ldots, d_n$, and m fixed base raw inputs/variables, $V_1, V_2, \ldots V_m$. They can have either categorical or numerical values. Let the label/tag associated with each data point be either fraud or non-fraud. Rules/association of base inputs/variables can be discovered so that the simultaneous occurrences of some of the input conditions indicate a high likelihood of either a fraud or non-fraud event. These rules/associations of input variables can be discovered by generating a decision tree, one example being using a standard C4.5/ID3 algorithm, which is known to persons of ordinary skill in the art. These rules are expressed as paths from the root of the tree to the leaves. The rules may be pruned using a pruning algorithm, such as a standard C4.5 algorithm or other pruning algorithm which will help the rules better generalize on future unseen fraud/non-fraud data encountered by the adaptive model in production.

Figure 2:
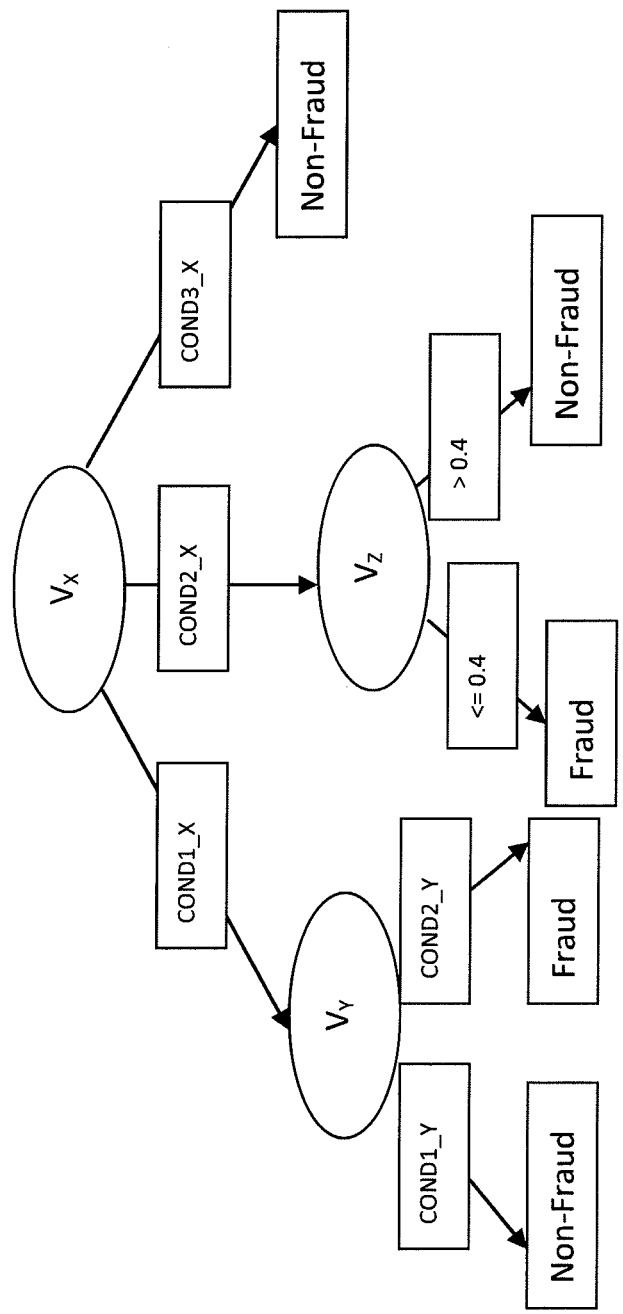
FIG. 2 shows an example of a decision tree, from which the automatic variables are derived.

Each rule is then converted into a numerical indicator variable which can be used as inputs to an adaptive model training algorithm, such as described in U.S. patent application Ser. No. 12/040,796, the contents of which are incorporated by reference herein for all purposes. FIG. 2 shows an example of a decision tree built using C4.5 as an example. It is important to note, that although C4.5 is used for exemplify purposes that the actual algorithm chosen must be one that is computationally suitable for the production environment where this will be run. As an example, in fraud the algorithm will be automated and must run within certain computational requirements associated with the live production system.

Let $V_x, V_y, V_z$ be the base raw inputs/variables selected by C4.5 as nodes in the decision tree. The set $\{V_x, V_y, V_z\}$ is a subset of the base raw inputs/variables $\{V_1, V_2, \ldots V_m\}$ C4.5 will select them using an information gain metric, entropy, which characterizes the impurity or purity in a sample data.

Assume $V_x$ has three possible categorical values indicated by COND1_X, COND2_X, and COND3_X, $V_y$ has two possible categorical values indicated by COND1_Y, and COND2_Y, and $V_z$ is a numerical input. The tree built by C4.5 is as shown in FIG. 2.

Each path from the root ($V_x$) to a leaf is associated with a class (fraud/non-fraud), and is also known as a rule. The path indicates that if all the preconditions (nodes of the tree) of the rule hold true, then the outcome is likely the class associated with the leaf. Therefore, each individual path/rule from the root to the leaves can then be converted to a binary indicator variable, as an example, or other variable techniques can be utilized. Some of the preconditions in a path may be removed later to make the variables generalize better, typically referred to as "pruning." This can be done using any pruning algorithm such as that of C4.5 rules program available in the C4.5 algorithm.

Figure 3:
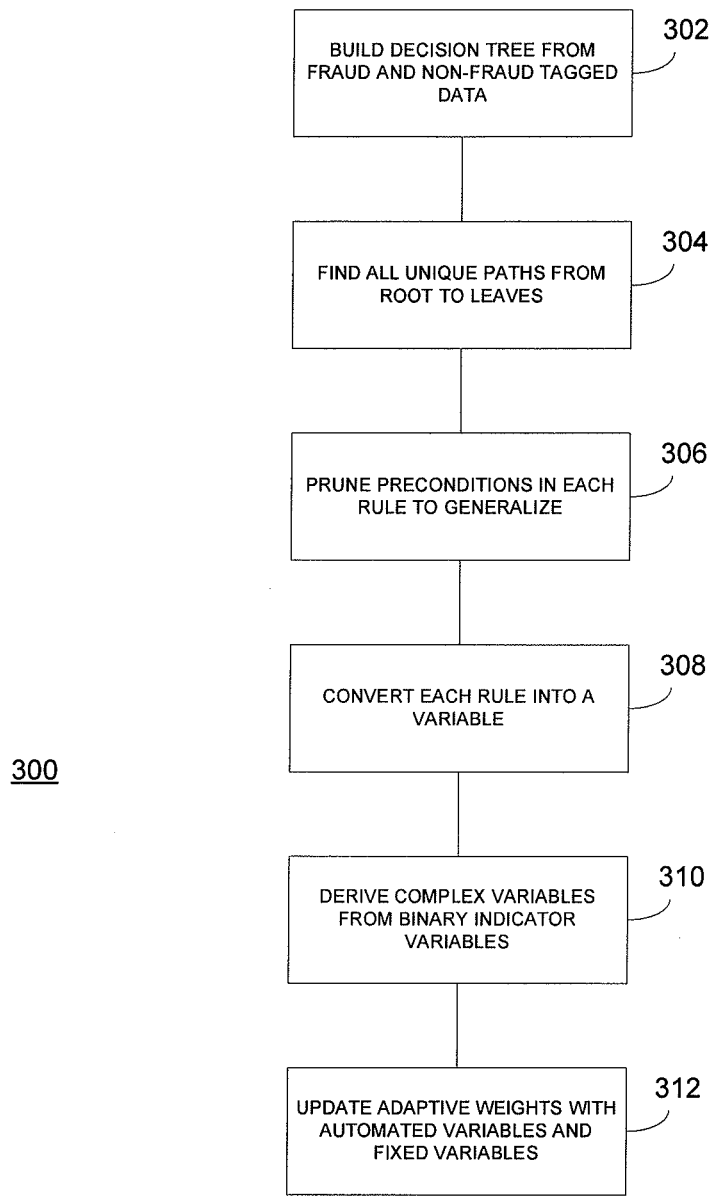
FIG. 3 is a flowchart of a method for adaptive analytics and automatic variable creation
Figure 4:
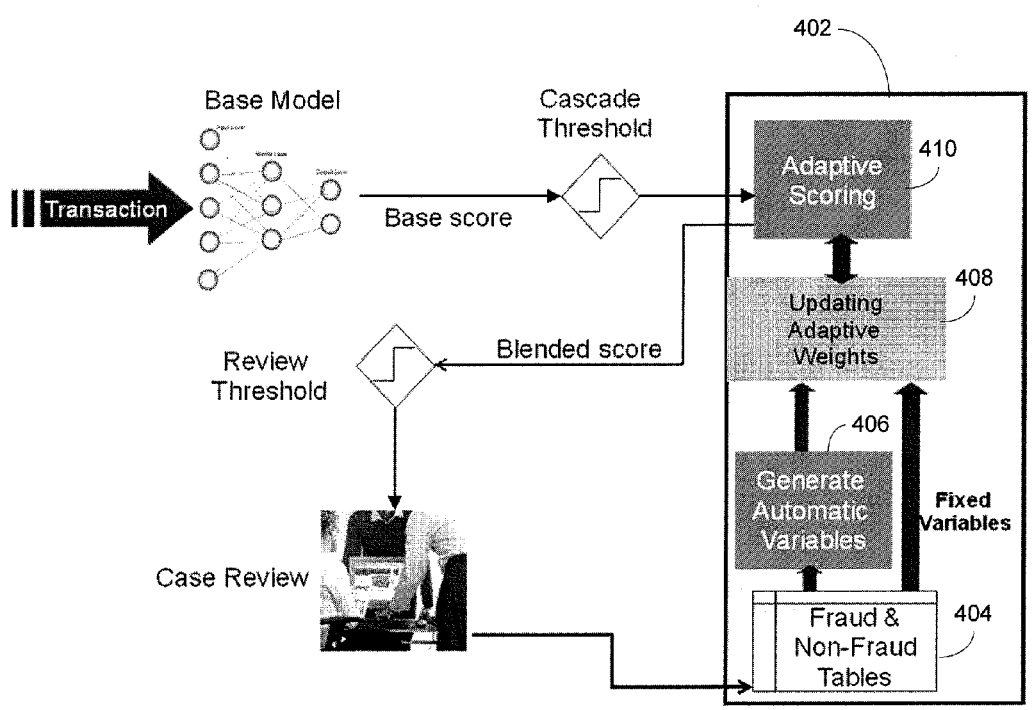
FIG. 4 illustrates a fraud detection system with a static base model and an adaptive model that uses automatic variable creation.

FIG. 3 is a flowchart of a method 300 for adaptive analytics and automatic variable creation. FIG. 4 is a functional block diagram of a Fraud Adaptive Analytics system 400, showing how automated variable creation 406 fits into the workflow of an analytics component 402 of the system 400.

At 302, a decision tree is built from fraud and non-fraud tagged data collected periodically in an adaptive model using a decision tree technology such as C4.5 or its variants. At 304, all unique paths are found from the root of the tree to the leaves. Each path is a rule.

At 306, some preconditions in each rule are pruned to generalize better, if necessary. This is achieved by removing irrelevant preconditions in a rule, which removes some of the preconditions while maintaining overall accuracy of the rule. For example the C4.5 rules pruning program uses a pessimistic estimation method to determine if certain preconditions could be removed without affecting the rule performance.

At 308, each rule is converted to a binary indicator variable as an example of various methods; that is, when all preconditions in a rule are true, the variable takes a value of 1. The default value of the variable is 0.

At 310, complex variables are derived from these simple binary indicator variables by using historical information and cross relationships. One can also use the transaction history of key binary rule variables to understand trends in these variables over time and to create new variables, one example of this would be transaction profiling. Steps 302 through 310 represent the "Automated Variables Generation" block 406 in FIG. 4, also referred to herein as an "automatic variable generator" as implemented by one or more computer processors.

At 312, the automated variables along with the fixed variables are used for retraining in the "Updating Adaptive Weights" block 406 of FIG. 4, also referred to herein as an "adaptive weights updater" as implemented by one or more computer processors. This will allow an adaptive scoring engine 410 of the adaptive scoring model to find the correct weighting of the automated and fixed variables to best track changes in fraud and non-fraud patterns/behavior in production.

Rules which can be generated from FIG. 2 above are as follows:

| | | |
|---|---|---|
| If (Vx = COND1_X and Vy = COND1_Y) | THEN | Non-fraud |
| If (Vx = COND1_X and Vy = COND2_Y) | THEN | Fraud |
| If (Vx = COND2_X and Vz <= 0.4) | THEN | Fraud |
| If (Vx = COND2_X and Vz > 0.4) | THEN | Non-Fraud |
| If (Vx = COND3_X) | THEN | Non-Fraud |

The five rules above now can be converted to 5 binary indicator variables, which will take a value of 1 when their preconditions are true. Because this approach is driven by a decision tree technology to derive rules and the associated variables, these rules are constantly re-evaluated and new rules discovered as the production fraud/non-fraud data changes over time in the Fraud and Non-Fraud tables 404 in FIG. 4.

Instead of one decision tree, multiple decision trees may also be generated by randomly selecting smaller subsets, with or without replacement, from the set of initial raw inputs/variables. This will create a random forest. Each tree will be generated from a smaller number of inputs, and the rules deduced from the tree are likely to be shorter. The rules variables deduced from multiple trees may be more robust due to ensemble effect. More trees variables may be generated by randomly selecting a subset with replacement (in this case the subsets will not be distinct).

Example

Consider a data set having n data points, $d_1, d_2, \ldots, d_n$, and m fixed base raw inputs/variables, $V_1, V_2, \ldots, V_m$:

The set $\{V_x, \ldots V_y, V_z\}$, $\{V_{x1}, \ldots, V_{y1}, V_{z1}\}, \ldots,$ $\{V_{xk}, \ldots, V_{yk}, V_{zk}\}$ are subsets of the base raw inputs/variables $\{V_1, V_2, \ldots, V_m\}$. There may be overlap of inputs among the subsets, if they are randomly selected with replacement. From each subset a tree is generated and converted into rules. Because multiple trees are generated from different input subsets, the total number of rules of all trees is likely to be greater than that of generated using a single tree from all inputs. This is one way of expanding the number of tree-based rules variables, and also may be more robust due to the ensemble effect.

Although the approach of automated variable creation with adaptive models is exemplified with Fraud Analytics problems, this approach is broadly applicable to a multitude of time-varying modeling problems. One example includes credit risk, which can vary with macro-economic trends such as periods of inflation or recession. As economic conditions change, the dynamics of credit risk varies and an adaptive model coupled with an automated variable creation technique can make the model sensitive to new features derived in production reflective of changes in the use of credit for example associated with increased job loss numbers, foreclosure rates, stimulus plans, or the number of under-water mortgages. Another application includes retail applications, such as the prediction of consumer purchasing where the consumer behavior changes rapidly due to fads, recalls, or competing store sales. The approach can be used for other applications as well.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method comprising:
    generating a data structure, the data structure having nodes representing fraud or non-fraud conditions, and having associations between nodes, the data structure being generated from fraud and non-fraud data collected in an adaptive modeling process that determines the fraud and non-fraud conditions from past transactions;
    determining all unique paths between nodes of the data structure to define a rule for each path, each rule having one or more preconditions;
    converting each rule to a binary indicator variable to generate a set of binary indicator variables;
    deriving one or more complex variables from the set of binary indicator variables;
    determining, by an adaptive weights adaptor, an adaptive weight for each binary indicator variable to obtain weighted values of the set of binary indicator variables and an adaptive weight for each complex variable to obtain weighted values of the one or more complex variables; and
    providing the weighted values of the set of binary indicator variables and the weighted values of the one or more complex variables to an adaptive scoring engine to generate a score for new transactions, the score representing a likelihood whether each new transaction is fraudulent.

2. The computer-implemented method in accordance with claim 1, further comprising pruning at least one precondition from the one or more preconditions of each rule.

3. The computer-implemented method in accordance with claim 2, wherein the preconditions are pruned to make a selected rule more general while maintaining rule performance with remaining preconditions of the selected rule.

4. The computer-implemented method in accordance with claim 1, further comprising providing a set of fixed variables with the one or more binary indicator variables or complex variables to the adaptive scoring engine to score the new transactions.

5. The computer-implemented method in accordance with claim 1, wherein the converting is performed when all preconditions of a rule are true.

6. The computer-implemented method in accordance with claim 1, wherein the deriving is based on historical information and cross relationships of the binary indicator variables.

7. The computer-implemented method in accordance with claim 1, wherein the deriving is based on transaction profiling of key binary rule variables based on the binary indicator variables and use of transaction history.

8. A computer program product comprising a non-transitory machine-readable medium storing instructions that, when executed by at least one programmable processor, cause the at least one programmable processor to perform operations comprising:
    generating a data structure, the data structure having nodes representing fraud or non-fraud conditions, and having associations between nodes, the data structure being generated from fraud and non-fraud data collected in an adaptive modeling process that determines the fraud and non-fraud conditions from past transactions;
    determining all unique paths between nodes of the data structure to define a rule for each path, each rule having one or more preconditions;
    converting each rule to a binary indicator variable to generate a set of binary indicator variables;
    deriving one or more complex variables from the set of binary indicator variables;
    determining, by an adaptive weights adaptor, an adaptive weight for each binary indicator variable to obtain weighted values of the set of binary indicator variables and an adaptive weight for each complex variable to obtain weighted values of the one or more complex variables; and
    providing the weighted values of the set of binary indicator variables and the weighted values of the one or more complex variables to an adaptive scoring engine to generate a score for new transactions, the score representing a likelihood whether each new transaction is fraudulent.

9. The computer program product in accordance with claim 8, further comprising instructions to cause the at least one programmable processor to prune at least one precondition from the one or more preconditions of each rule.

10. The computer program product in accordance with claim 9, wherein the preconditions are pruned to make a selected rule more general while maintaining rule performance with remaining preconditions of the selected rule.

11. The computer program product in accordance with claim 8, further comprising instructions to cause the at least one programmable processor to provide a set of fixed variables with the one or more binary indicator variables or complex variables to the adaptive scoring engine to score the new transactions.

12. The computer program product in accordance with claim 8, wherein the converting is performed when all preconditions of a rule are true.

13. The computer program product in accordance with claim 8, wherein the deriving is based on historical information and cross relationships of the binary indicator variables.

14. The computer program product in accordance with claim 8, wherein the deriving is based on transaction profiling of key binary rule variables based on the set of binary indicator variables and use of transaction history.

15. A system comprising:
an automatic variable generator, implemented by one or more processors, that generates a data structure, the data structure having nodes representing fraud or non-fraud conditions, and having associations between nodes, the data structure being generated from fraud and non-fraud data collected in an adaptive modeling process that determines the fraud and non-fraud conditions from past transactions, the automatic variable generator determining all unique paths between nodes of the data structure to define a rule for each path, converting each rule to a binary indicator variable to generate a set of binary indicator variables, and deriving one or more complex variables from the set of binary indicator variables; and
an adaptive scoring engine, implemented by one or more processors, that receives weighted values of the set of binary indicator variables and weighted values of the one or more complex variables from an adaptive weights adaptor connected to the automatic variable generator and the adaptive scoring engine, the adaptive scoring engine using the weighted values of the one or more binary indicator variables and the weighted values of the one or more complex variables to generate a score for new transactions, the score representing a likelihood whether each new transaction is fraudulent.

16. The system in accordance with claim 15, wherein each rule has one or more preconditions.

17. The system in accordance with claim 16, wherein the automatic variable generator prunes at least one precondition from the one or more preconditions of each rule.

18. The system in accordance with claim 17, wherein the preconditions are pruned to make a selected rule more general while maintaining rule performance with remaining preconditions of the selected rule.

19. The system in accordance with claim 15, wherein the automatic variable generator provides a set of fixed variables with the one or more binary indicator variables or complex variables to the adaptive scoring engine to score the new transactions.

20. The system in accordance with claim 15, wherein the converting is performed when all preconditions of a rule are true.

* * * * *